United States Patent [19]
Hauer et al.

[11] Patent Number: 5,891,115
[45] Date of Patent: Apr. 6, 1999

[54] SECURING ELEMENT

[75] Inventors: Jürgen Hauer, Voitsverg, Austria; Gerd Schöneborn, Bad Berleburg, Germany

[73] Assignee: EJOT Kunststofftechnik GmbH & Co. KG, Bad Berleburg-Berghausen, Germany

[21] Appl. No.: 650,377

[22] Filed: May 20, 1996

[30] Foreign Application Priority Data

May 26, 1995 [DE] Germany .................. 295 08 778 U
Mar. 26, 1996 [DE] Germany .................. 296 05 620 U

[51] Int. Cl.$^6$ ........................................... B60B 35/00
[52] U.S. Cl. ..................... 301/111; 301/5.3; 411/81; 411/166
[58] Field of Search ................ 301/1, 5.3, 5.7, 301/7, 105.1, 111, 114, 115, 117, 124.1, 124.2, 125, 126, 131, 137; 411/81, 87, 88, 89, 103, 134, 166, 172, 173, 174, 175

[56] References Cited

U.S. PATENT DOCUMENTS

| | | | |
|---|---|---|---|
| 619,225 | 2/1899 | Reece | 301/5.3 X |
| 2,048,916 | 7/1936 | Bentzlin | 301/5.3 X |
| 3,418,869 | 12/1968 | Herpich | 301/5.7 X |
| 3,434,521 | 3/1969 | Flora | 411/166 X |
| 3,785,670 | 1/1974 | Smith | 301/117 X |
| 4,056,893 | 11/1977 | Willard | 411/166 X |
| 5,129,663 | 7/1992 | Soo | 280/11.22 X |
| 5,193,827 | 3/1993 | Olson | 280/11.22 X |
| 5,271,633 | 12/1993 | Hill, Jr. | 301/5.7 X |
| 5,308,152 | 5/1994 | Ho | 301/5.3 |
| 5,356,209 | 10/1994 | Hill | 301/5.7 |
| 5,374,072 | 12/1994 | Landers | 301/111 X |
| 5,470,086 | 11/1995 | Peterson et al. | 301/5.7 X |

FOREIGN PATENT DOCUMENTS

| | | | |
|---|---|---|---|
| 734762 | 10/1922 | France | 301/125 |
| 184903 | 6/1936 | Switzerland | 280/11.22 |

*Primary Examiner*—Russell D. Stormer
*Attorney, Agent, or Firm*—Frohwitter

[57] ABSTRACT

An inline skate having an inline skate wheel; an in line skate axle which extends through the inline skate wheel and has a female receiving element; an inline skate frame which supports the inline skate axle, wherein the inline skate axle has a first contacting surface for contacting the inline skate frame; a securing element that has a second contacting surface for contacting the inline skater frame, and a male thread element for engaging the female receiving element of the inline skate axle, and a positive acting element for exerting a retention force against the inline skater frame, wherein the female receiving element does not have threads prior to engagement of the female receiving element with the male thread element, and wherein the male thread element is a self forming thread which forms a thread in the female receiving element upon engagement.

17 Claims, 3 Drawing Sheets

SECURING ELEMENT

The invention relates to a securing element for inserting into a frame and for securing a screw connection, especially for securing an axle being inserted through a wheel of an inline skate.

With the fastening of the rollers or wheels, respectively, of an inline skate, that means a single track roller skate, it is known to secure these by means of a counter screw. Into the roller, which is mounted between the frame, a nut with a thread, preferably made of aluminum, is inserted. Two screws are inserted through the frame from opposite ends end screwed in with a respectively high tightening moment, such that this results in a clamping between the nut and the screw with the frame lying there between.

According to another variation, an axle is inserted through the frame and the wheel and screwed into a nut having a thread. The securing of the screwing connection is accomplished by means of a tuflock coating. That means that a drop of coating is applied to the thread of the axle. This material has the property to harden just like a fluid screw securing, the coating having properties similar to elastomers, such that a multiple screwing can be accomplished with self securing effect. This self securing is, however, diminished with each screwing operation.

The known securing systems are all based on metal elements, or on a combination of metal and plastic, respectively.

It is the object of the present invention to provide a reliable and, nevertheless, simple structured securing element for insertion into a frame, which is especially suitable for the fastening of wheels or rollers, respectively, to inline skates. This object is achieved by an element as defined in claim 1. Preferred embodiments are defined in the dependent claims.

Especially, a securing element for insertion into a frame and for securing a screw connection, especially for securing an axle being inserted through a wheel of an inline skate, is provided, comprising:

a surface being able to be brought in contact with a frame, a receiving element for an element being equipped with a thread and an element exerting a retention force being able to be mounted to said frame and being able to act on said frame.

The element exerting a retention force, may especially be a flanged section type positively acting element in a shank region, which is positive with the securing hole arranged to said frame, when mounted to said frame. This can be used where systems shall be used which are screwed on a block. This is a collar under the head of the screw, which contacts the frame before or at the same time as the head and which rests at the axle. In order to also accomplish an additional dynamic security, this collar can also be provided with a profile.

Preferably, the element exerting a retention force is a profile type positively acting element developed especially at the surface, which is to be contacted. Such a profile can for instance be provided as locking teeth. The axle and the screws can also be provided with a collar beneath the head, which stays directly at the bearing of the inline skates. With this type of screwing, the system is screwed with a special tightening moment and the screw head thereby comes to abutment, the provided profile beneath the head engaging into the frame and ensuring the desired retention force.

It is especially preferred to provide a securing element, with which the element having a thread, is the axle or the securing screw functioning as an axle counterpart. The geometry of the thread thus can also be provided at the securing screw, that is the counterpart of the axle. In this manner features of the mounting can be taken into account. Especially, the providing of the thread at the securing screw is preferred, since therefore no inner thread is necessary and, therefore, a simplified production process is achieved.

With a preferred embodiment of the present invention the securing element is made of plastic, steel or light metal. The axle can be molded of plastic or be manufactured from light metal or steel by means of cold forming, sintering also being a possibility, especially with complicated geometries. By the cold forming of these materials a partial solidifying of the material at the potential weak region of the axle is achieved, thereby enhancing the solidity. By forming the thread in steal, light metal or plastic, a thread without tolerance and without set-off of the axle is achieved, thereby providing a dynamic securing of the first mounting with steel and light metal, respectively, with plastic also at repeated mountings. In general, a formed thread in steel or light metal, respectively, has a higher friction of the thread, thereby achieving without additional securing element with the repeated mountings a better dynamic security. Preferred materials are especially plastic, aluminum, titan, magnesium or zinc alloys, steel or stainless steel. It is especially preferred to use for the self forming thread and the receiving element, which receives the thread, matching combinations of the material. The thread can preferably be made of metal, especially case hardened or quenched and, subsequently, drawn steel (PT-thread by EJOT for plastic and light metal, thread forming screw according to DIN 7500 for steal or light metal), of light metal or of stainless steal.

In a further preferred embodiment of the invention, a securing element is provided, the thread of which has a nylon coating. By such a coating a sufficient dynamic security with repeated mountings is achieved with a self forming or self cutting, respectively, thread made of steel with light metal versions.

Since a securing element according to the invention can be completely made of plastic, its weight can be kept relatively small. By providing the flanged section, high screwing in or screwing out, respectively, moments can be transmitted on the frame with materials with a low solidity. The reliable self securing is retained even with repeated mounting or demounting, respectively. This is also true when the securing element, or the securing nut, is completely made of plastics for reasons of less expensive production. The axle inserted into the securing nut can have a thread, for instance a metric or a Whitworth-thread. Preferably, the thread of the axle is of a self forming type of a thread as the EJOT PT-threads or EJOT DG-threads, products obtainable on the market. In this case, no thread has to be provided in the receiving element of the securing nut.

When using loads which are not too big, no metal components are needed with the securing element. The grading of the tightening moments is easily controllable. Also, a certain compensation for the tolerances is possible by variable screwing depths. Further, an individual adaption of the front side which can be seen to needs of the design can easily be realized.

Further, advantages, features and embodiments of the invention result from the following description of the embodiment in connection with the figures of the drawing.

FIG. 1a shows a front view of the securing nut;

FIG. 1b shows a side view of the securing nut;

FIG. 1c shows a section through the securing nut according to FIG. 1a;

Figure 1:
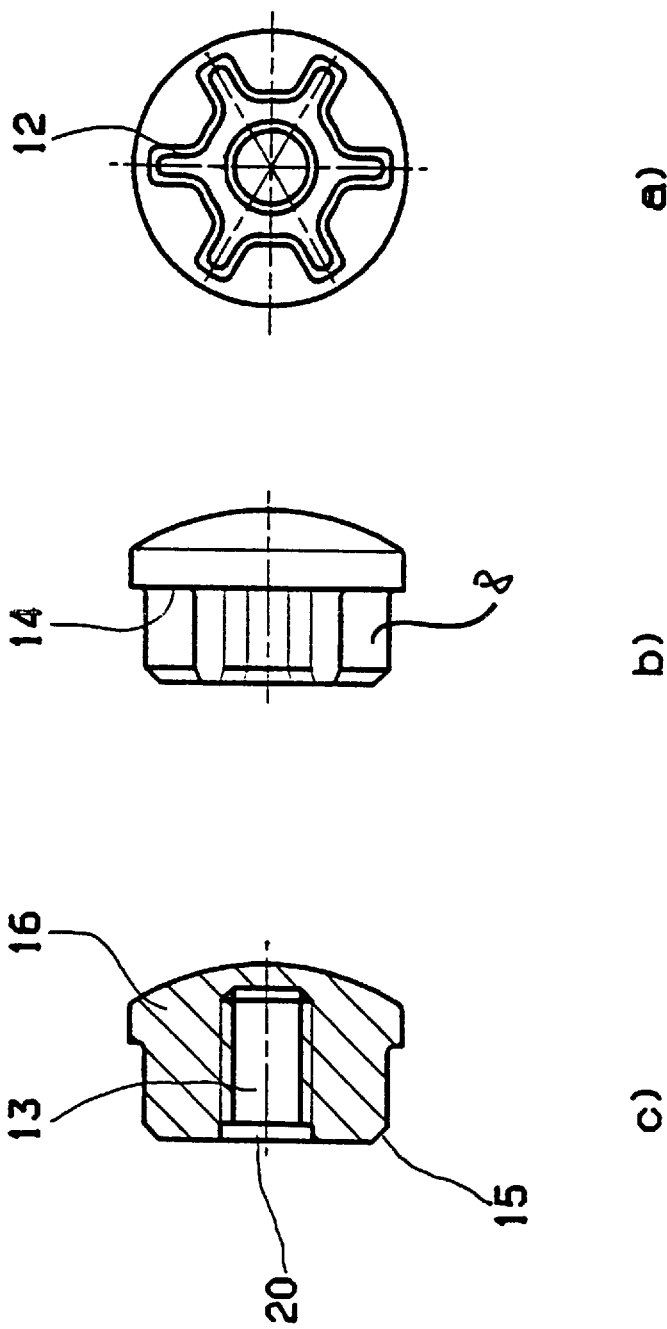

FIG. 1 shows a front view of the securing nut 16. The upper edges of the star-like, flanged section type positively acting element 12 and the upper edge of the shank 8 are slanted. This makes it easier to insert the securing nut in the receiving securing hole 7 in frame 3, being designed as a counterpart. The flanged section 12 extends over the whole length of the shank.

In FIG. 1b a side view of the securing nut 16 is shown. It has a contacting surface 14 for contacting the frame 3.

FIG. 1c shows a section through the securing nut, shown in FIG. 1b. The chamfer at the flanged section 12 has the reference numeral 15. The receiving element 13 only after the first screwing in of the axle 4 with the self forming thread has a thread. At the inlet of the receiving element 13, a countersink 20 is inserted as a kind of step as a fixed reference point for the front side 19 of the axle 4. The moments of screwing in or screwing out, respectively, of the axle 4 in the nut 16 could for instance be controlled by changes in the thread of the axle 4 and/or the nut 16, the change of the diameter, the length of the thread and the lead in a simple manner.

Figure 2:
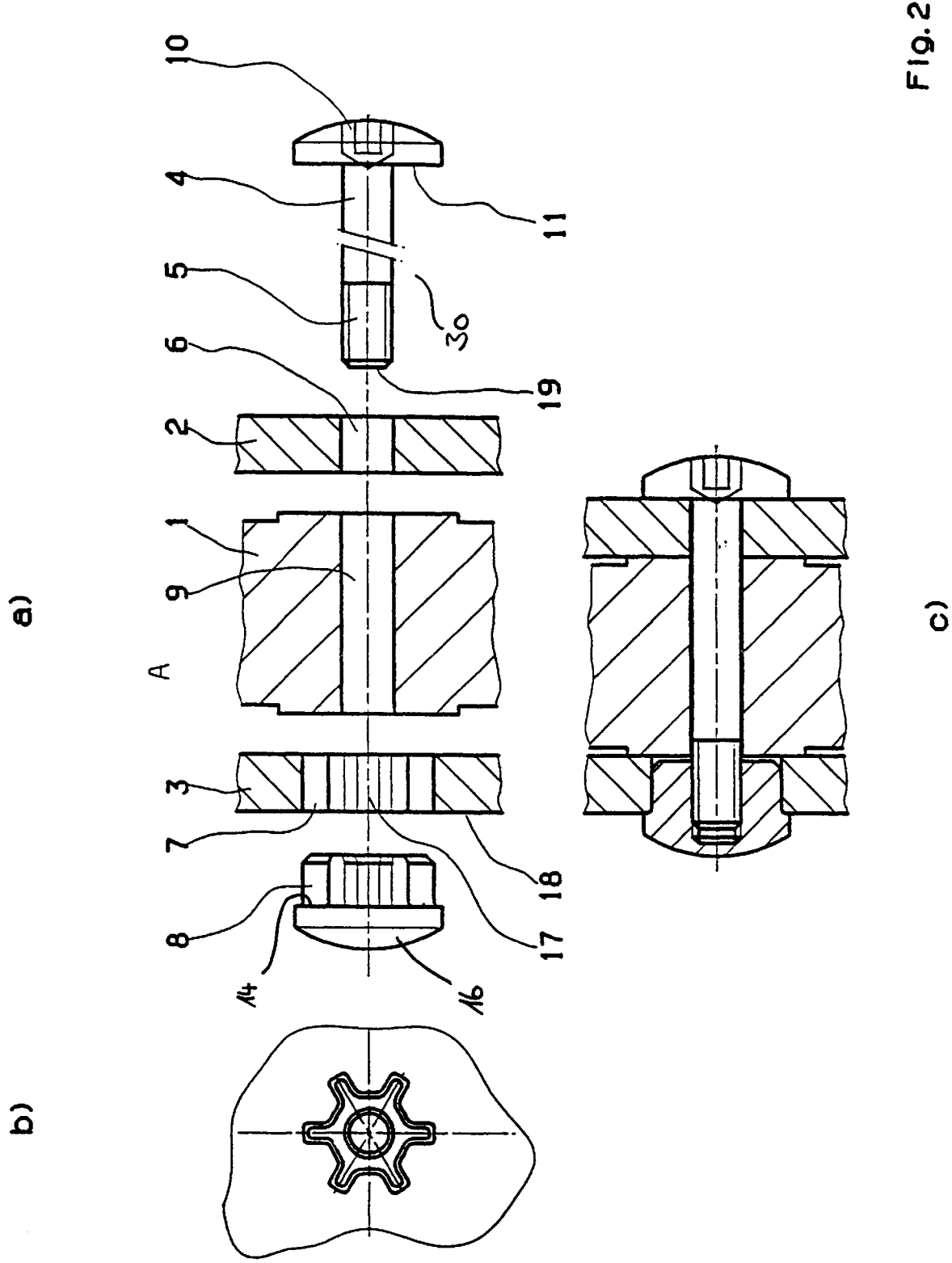
FIG. 2a shows an exploded view before the fastening of the axis in the securing nut.
FIG. 2b shows the flanged section type positively acting element in the shank region of the securing nut.
FIG. 2c shows the securing nut being inserted in the frame engaging with the axle.

FIG. 2a shows in an exploded view the securing nut 16, the frame 2, 3, the wheel 1 and the axle 4 before fastening. For mounting, first the nut 16 with the respective flanged section is inserted into the provided securing hole 7 of frame 3, until the contacting surface 14 of the nut is in contact with the contacting surface 18 of frame 3. Because of the large contacting area, which is achieved between the securing nut and the frame because of the construed, preferably more than one flange, flanged section 12, even with a relatively soft material of the frame 3, a relatively high tightening moment can be transmitted.

Subsequently, the wheel 1 is premounted between the two flanks of the frame in such a way that the center axle of the boreholes 6, 9, 17 overlap. The axle 4 is now inserted from the other side of frame 2 through the holes 6, 9, 17 until the front side 19 gets into contact at the countersink 20 of the nut, that means that it engages. With the help of the drive 10 at the axle 4, the thread 5 can be screwed into the nut 16 in a self-forming manner until the contacting surface 11 of the axis 4 is in contact with frame 2. Thus, the system is fixed free from play. Even with multiple screwing, the system is self securing because of the properties of the securing nut. Thus, it is especially advantageous to choose the screw running direction of the axle 4 in the main rotation direction of the wheel 1. Confusion because of the insertion of axle 4 and nut 16 at the wrong side are excluded by the geometry of the flanged section 12 and the herefore provided securing hole 7 provided for this purpose at only one side of the frames 2, 3.

Figure 3:
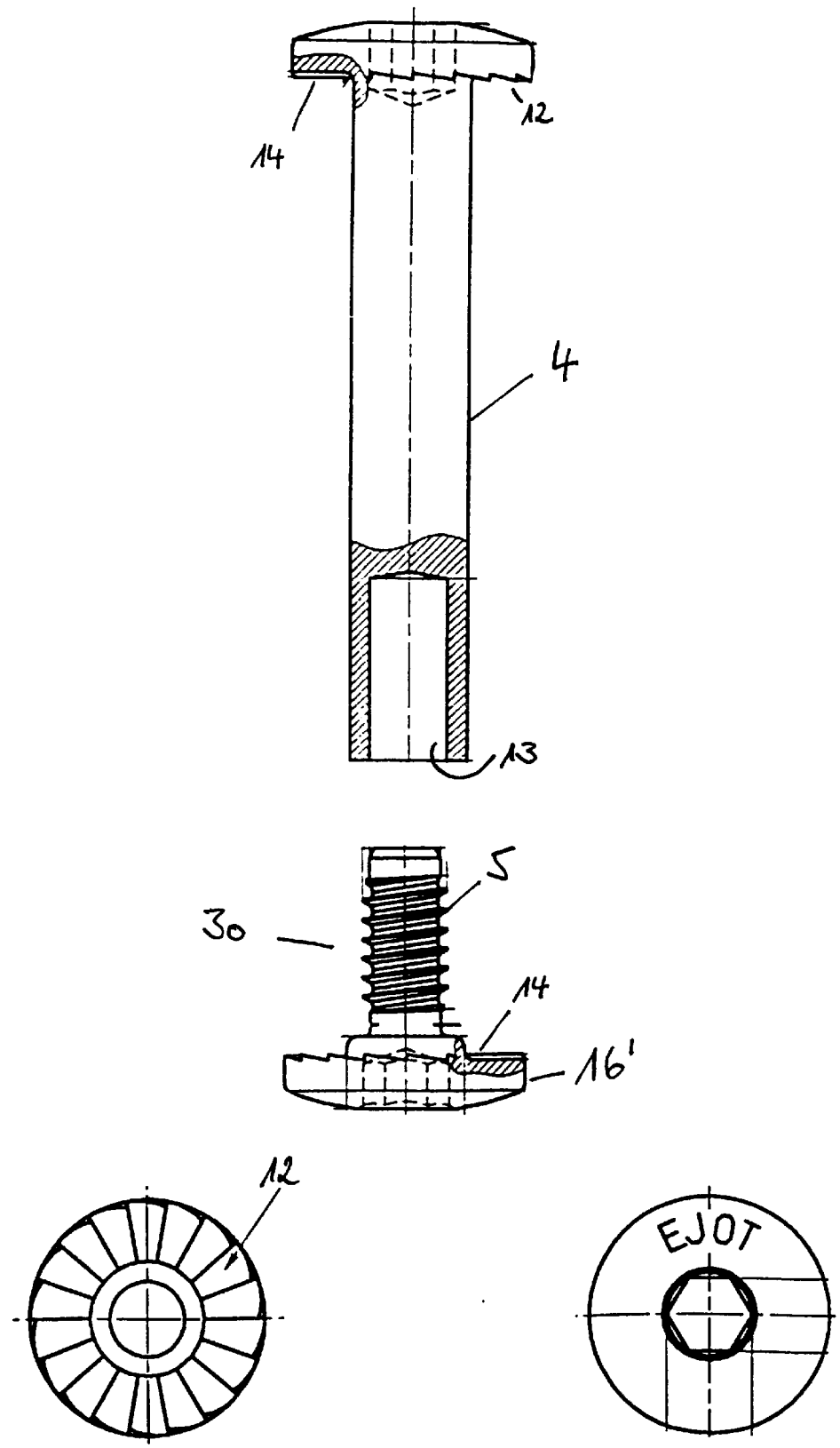
FIG. 3 shows an exploded view of still another embodiment of the present invention before fastening the securing screw in the axle.

FIG. 3 illustrates in an exploded view the securing screw 16' and the axle 4 before the fastening. In this embodiment the self forming thread 5 is attached to the securing screw 16'. The receiving element 13 is on the other hand provided in the axle. Beneath the collar of the securing screw 16' and also of the axle 4 a profile is provided, in this case a locking teeth profile 21. These hereby formed contacting surfaces 14 contact the frames 2, 3 with the mounting directly and, thus, effect an additional dynamic security.

We claim:

1. An inline skate comprising:
   an inline skate wheel;
   an inline skate axle which extends through said inline skate wheel and comprises a female receiving element;
   an inline skate frame which supports said inline skate axle, wherein said inline skate axle comprises a first contacting surface for contacting the inline skate frame;
   a securing element that comprises:
      a second contacting surface for contacting the inline skater frame, and
      a male thread element for engaging the female receiving element of said inline skate axle; and
   a positive acting element for exerting a retention force against the inline skater frame, wherein said female receiving element does not comprise threads prior to engagement of the female receiving element with the male thread element, and wherein the male thread element is a self forming thread which forms a thread in the female receiving element upon engagement.

2. An inline skate as in claim 1, wherein the inline skate frame comprises a securing hole having a geometry, and wherein the positively acting element is in a shank region of the securing element which positively engages the securing hole having a geometry in said inline skate frame when mounted to said inline skate frame.

3. An inline skate as in claim 2, further comprising a chamfer at a leading edge of said securing element which is insertable into the securing hole of the inline skate frame.

4. An inline skate as in claim 1, wherein the positively acting element for exerting a retention force against the inline skate frame is a locking teeth profile on the first contacting surface.

5. An inline skate as in claim 1, wherein the securing element comprises a material selected from the group consisting of plastic, steel and light metal.

6. An inline skate as in claim 1, wherein the receiving element comprises a nylon coating.

7. An inline skate as in claim 1, wherein the inline skate frame comprises a securing hole having a geometry, and wherein the positively acting element has several flanges formed therewith for a positive fitting of the securing element with the securing hole having a geometry formed as a counterpart to the flanges, wherein the flanges are arranged in a star-like manner.

8. An inline skate as in claim 1, wherein the receiving element comprises a countersink for positioning the male thread element.

9. An inline skate as in claim 1, wherein the inline skate frame comprises a securing hole having a geometry, and wherein the positively acting element is in a shank region of the inline skate axle which positively engages the securing hole having a geometry in said inline skater frame when mounted to said inline skate frame.

10. An inline skate as in claim 1, wherein the positively acting element for exerting a retention force against the inline skate frame is a locking teeth profile on the second contacting surface.

11. A securing element of an inline skate axle to an inline skate frame, the inline skate axle being inserted through an inline skate wheel and the inline skate frame, wherein the inline skate axle comprises a first contacting surface and a female receiving element, said securing element comprising:
   a second contacting surface for contacting the inline skate frame;
   a male thread element for engaging the female receiving element of said inline skate axle; and a positive acting element for exerting a retention force against the inline skate frame, wherein said positive acting element hinders movement of the securing element when the female receiving element of said inline skate axle is engaged by the male thread element, wherein said female receiving element does not comprise threads which correspond to the male thread element prior to engagement of the female receiving element with the male thread element, and wherein the male thread element forms threads in said female receiving element when said female receiving element engages the male thread element.

12. A securing element of an inline skate axle to an inline skate frame as in claim 11, wherein the positively acting element is in a shank region of the securing element which positively engages a securing hole, which has a geometry in said inline skate frame, when mounted to said inline skate frame.

13. A securing element of an inline skate axle to an inline skate frame as in claim 12, further comprising a chamfer at a leading edge of said securing element which is insertable into the securing hole of the frame.

14. A securing element of an inline skate axle to an inline skate frame as in claim 11, wherein the positively acting element for exerting a retention force against the inline skate frame is a locking teeth profile on the second contacting surface.

15. A securing element of an inline skate axle to an inline skate frame as in claim 11, wherein the securing element comprises a material selected from the group consisting of plastic, steel and light metal.

16. A securing element of an inline skate axle to an inline skate frame as in claim 11, wherein the receiving element comprises a nylon coating.

17. A securing element of an inline skate axle to an inline skate frame as in claim 11, wherein the positively acting element has several flanges formed therewith for a positive fitting of the securing element with a securing hole, which has a geometry formed as a counterpart to the flanges in the inline skate frame, wherein the flanges are arranged in a star-like manner.

* * * * *